United States Patent [19]
Taylor

[11] Patent Number: 6,029,904
[45] Date of Patent: Feb. 29, 2000

[54] AGRICULTURAL SPRAYER WITH IMPROVED DISSOLUTION OF DRY CHEMICALS

[75] Inventor: Harold E. Taylor, LaGrange, Ga.

[73] Assignee: Durand-Wayland, Inc., LaGrange, Ga.

[21] Appl. No.: 09/140,841

[22] Filed: Aug. 27, 1998

Related U.S. Application Data

[60] Provisional application No. 60/057,104, Aug. 27, 1997.

[51] Int. Cl.[7] ........................................ B05B 9/00
[52] U.S. Cl. ............................................. 239/127
[58] Field of Search ...................... 239/127, 302

[56] References Cited

U.S. PATENT DOCUMENTS

| | | | |
|---|---|---|---|
| 2,246,866 | 6/1941 | Stribling et al. ................. | 239/127 X |
| 2,757,800 | 8/1956 | Kucera ............................. | 239/127 |
| 3,491,949 | 1/1970 | Hairston .......................... | 239/127 |
| 3,512,713 | 5/1970 | Carlyon ........................... | 239/127 |
| 3,784,100 | 1/1974 | Kirschmann ..................... | 239/127 X |
| 4,723,710 | 2/1988 | Lucore ............................. | 239/127 X |

Primary Examiner—Charles E. Phillips
Attorney, Agent, or Firm—Jones & Askew

[57] ABSTRACT

A sprayer reduces undissolved particulates in a liquid spray solution by pumping jets of the liquid toward an impact surface within the tank of the sprayer. The liquid jets and the impact plate are above the liquid in the tank, and the liquid drains into the tank after striking the plate. A screen keeps remaining undissolved particulates from the sprayer nozzles but not from the liquid flowing to the impact plate.

5 Claims, 3 Drawing Sheets

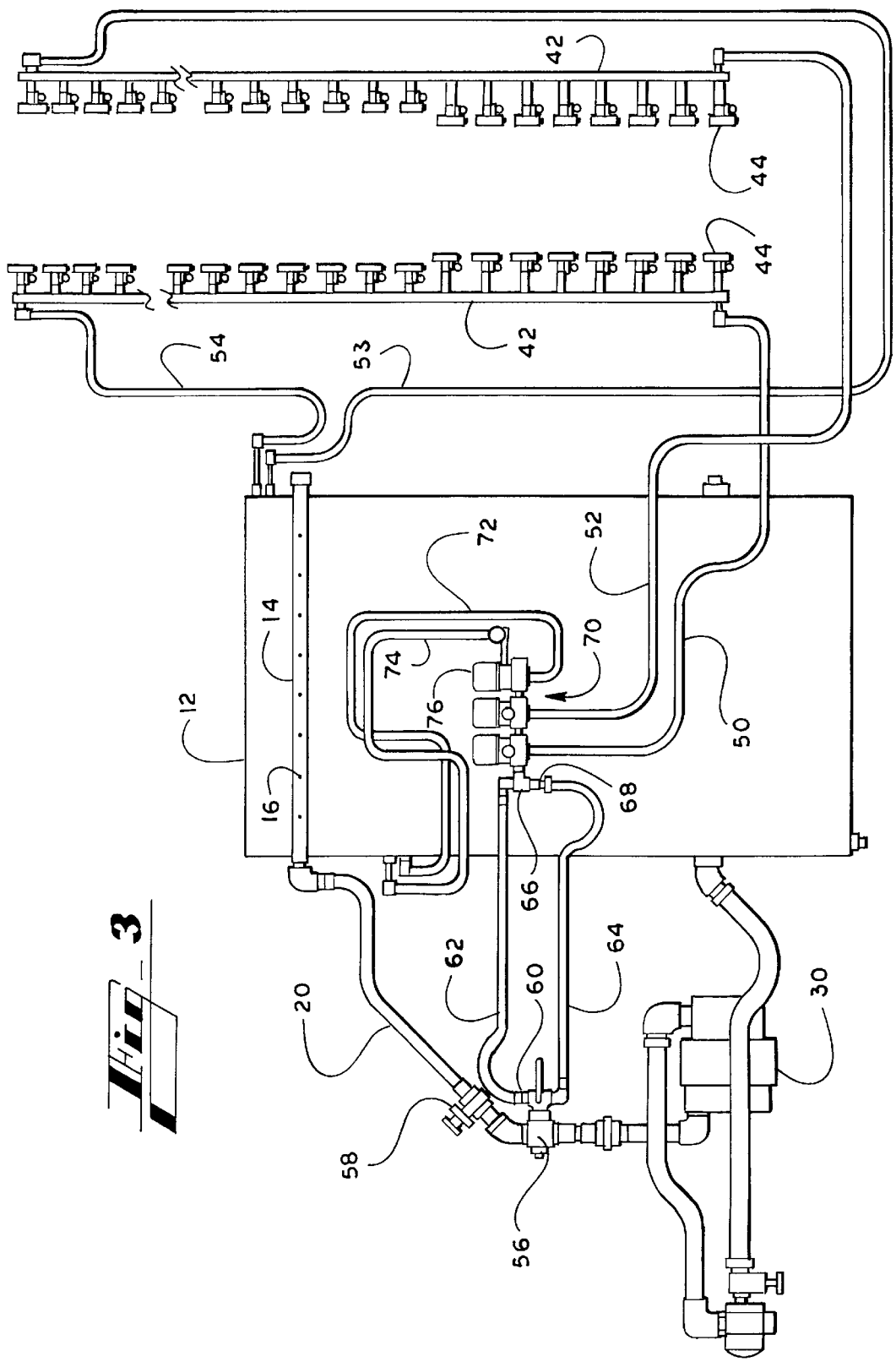

AGRICULTURAL SPRAYER WITH IMPROVED DISSOLUTION OF DRY CHEMICALS

CROSS-REFERENCE TO RELATED APPLICATION

This application claims the benefit of provisional application No. 60/057,104 filed Aug. 27, 1997.

FIELD OF THE INVENTION

This invention relates in general to sprayers, and relates in particular to sprayers for applying pesticides or other chemicals to growing agricultural products.

BACKGROUND OF THE INVENTION

Agricultural sprayers have been known and used for many years in applying a variety of chemical products to agricultural crops. A typical sprayer of the kind is towed by a tractor and includes a tank for receiving a supply of water and the desired agricultural chemical, mixed in accordance with a predetermined proportion. The sprayer carries spray nozzles configured to dispense and direct a liquid spray toward the particular agricultural products for which the spray is intended. The water and chemical mixture is supplied from the tank to the nozzles by a pump, which is typically driven by power takeoff from the tractor towing the sprayer.

The term "agricultural product" as used herein refers to orchards and groves in which trees bearing fruit or other products are the target of the spray, as well as row crops in which the crop being sprayed grows in rows and is relatively close to the ground. Those skilled in the art will know that the spray nozzles and related elements for directing the spray toward the intended target may vary depending on the intended used for which a particular sprayer is designed.

Agricultural chemicals intended for spray delivery usually are purchased in dry or powder form, for reasons of economy. The sprayer operator loads into the sprayer tank the desired chemical at a quantity determined to provide the desired chemical concentration, when the tank is filled with water to a predetermined operating capacity. This filling operation in practice typically takes place near a well or other source of water, which may be at some remote point from the grove or other location where the spraying will take place. Because the dry chemicals must be completely mixed with the water to produce a spray solution of the desired concentration, the tank of the typical agricultural sprayer is equipped with mixing paddles mounted on a rotatable shaft extending through the tank. This shaft is coupled to the power takeoff drive from the tractor. As the sprayer operator drives from the loading location to the point where spraying will commence, the shaft rotates within the tank so that the paddles agitate the liquid therein and help dissolve the dry chemical into solution with the liquid. The liquid delivery line from the sprayer to the spray nozzles may include a filter to prevent undissolved chemical and other particulate matter from reaching the spray nozzles, so as to prevent clogging the nozzles with solid particles.

The trend in agricultural sprayers is to operate the sprayer with a higher chemical concentration, combined with reducing the volume of spray emitted from the spray nozzles and directed toward the target of the spray. Reducing the volume of the liquid spray reduces the amount of airborne overspray that may overspray or otherwise miss the intended target. Because the spray at increased concentration is applied at a lower volume, the amount of the chemicals applied to the target is not substantially different from the amount supplied by higher-volume sprayers operating at a lower chemical concentration. The sprayers delivering a reduced volume of spray per acre (or other measure) also is more economical for the farmer, as the reduced delivery rate of the mixture in the sprayer tank yields a longer time between refills and thus reduces the amount of down-time required to spray a particular acreage.

Agricultural sprayers operating at a higher chemical concentration have a correspondingly greater need for all the chemical to enter into solution with the water in the spray tank. Because the delivery rate of the spray is reduced in high concentration sprayers, a given proportion of undissolved chemical causes a more significant reduction in the amount of chemical delivered to the target than in a conventional higher-volume sprayer. This reduces the effectiveness of the spraying operation and also constitutes a direct economic loss, because any undissolved chemical is wasted. Moreover, clogging the spray nozzles is an even greater problem because of the smaller orifices used in the spray nozzles of low-volume sprayers.

SUMMARY OF INVENTION

Stated in general terms, a sprayer according to the present invention diverts a portion of the sprayer pump output into a closed path recirculating back to the sprayer tank. The liquid being recirculated is forced through nozzles forming jets at relatively high velocity, and those jets of liquid impact a plate preferably mounted in the sprayer tank. These liquid jets impact the plate with sufficient force to pulverize undissolved particles of chemical moving in the recirculating liquid stream. The liquid jets and the impact plate preferably are mounted in the tank above the maximum level of liquid in the tank, so that the liquid jets strike the plate without being impeded by flow through the liquid within the tank.

Stated somewhat more particularly, the jets of liquid are in solid streams, and are formed by solid-stream nozzles directing jets of liquid toward an impact plate or similar surface as described above. Both the solid-stream nozzles and the impact plate disposed in front of those nozzles preferably are located within the sprayer tank, near the top of the tank so that the solid stream jets pass through the air in the space above the liquid in the tank. The liquid in the tank is recirculated through the closed path including the solid stream nozzles and the impact plate preferably by starting the sprayer pump as soon as the sprayer tank is filled. At this time, the liquid line leading to the conventional spray delivery nozzles remain turned off while the sprayer is traveling from the loading location to the start of a spraying operation. Once that starting location is reached, the sprayer operator then initiates spraying by opening the appropriate valves leading to the product delivery spray nozzles, preferably maintaining the flow path through the closed circuit including the nozzles and the impact plate within the sprayer tank. This constant recirculation of the liquid in the sprayer tank reduces or eliminates undissolved chemicals within the tank, thereby reducing waste of those chemicals and delivering a spray to the target at the intended chemical concentration, and reducing or preventing clogging of the spray nozzles.

The flow of liquid being recirculated to form jets impacting the plate within the sprayer tank preferably does not pass through a filter to remove particles of undissolved chemical. However, the flow of liquid being pumped to the sprayer nozzles preferably is filtered to remove particulate matter that might otherwise clog the relatively fine orifices of those nozzles. The recirculating liquid flow to the impact jets preferably flows through the hollow interior of a filter in cylindrical shape. However, the liquid path leading to the sprayer nozzles flows radially through the wall of the cylindrical filter, so that any undissolved chemical or other particulate matter is filtered from the liquid path flowing to the sprayer nozzles. The velocity of liquid axially flowing through the cylindrical filter tends to displace from the filter at least some particles of undissolved chemicals, so that those chemical particles enter the flow of liquid to the impact nozzles.

Other objects and advantages of the present invention will be apparent from the following description of a preferred embodiment.

BRIEF DESCRIPTION OF DRAWINGS

FIG. 3 is shows the plumbing for the liquid flow path of the sprayer according to the preferred embodiment.

DETAILED DESCRIPTION OF PREFERRED EMBODIMENT

Figure 1:
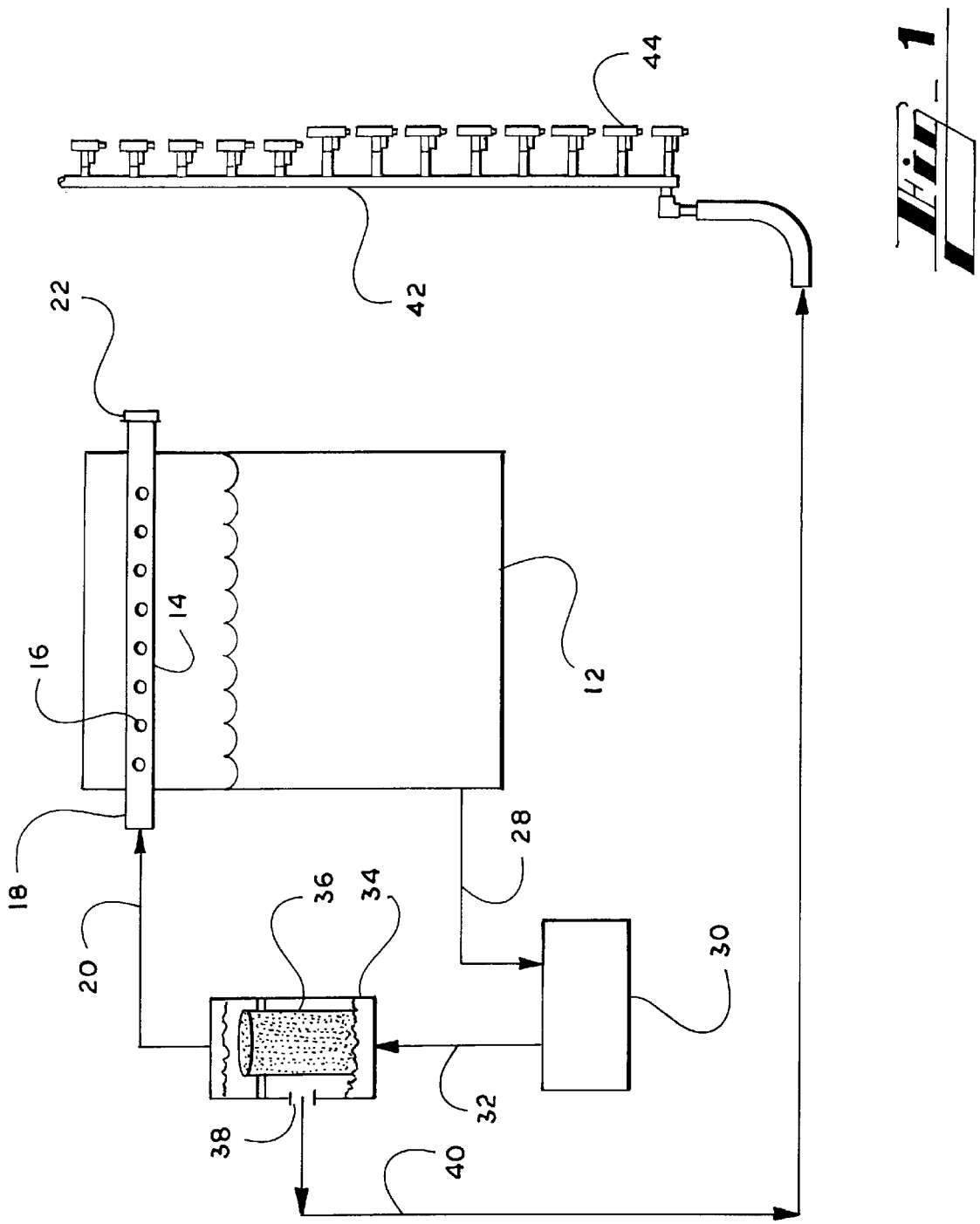
FIG. 1 is a schematic view showing the liquid flow path of a grove sprayer according to a preferred embodiment of the present invention.

FIG. 1 shows a schematic diagram of the plumbing assembly relevant to a sprayer embodying the present invention. The sprayer includes a tank 12 for receiving a supply of water or other liquid to be sprayed, and any suitable agricultural chemical to be mixed with that liquid. A pipe 14 extends through the tank 12 at an elevation above the maximum fill level in the tank. The pipe 12 is located in an air pocket formed at the upper end of the tank 12 and is fitted with a plurality of solid stream nozzles 16, with the nozzles preferably positioned to direct jets of liquid along a substantially horizontal path above the maximum upper level of liquid within the tank. One end 18 of the pipe 16 is connected to a liquid flow line 20, and the other end 22 of the pipe is capped.

The sprayer preferably is equipped with a conventional rotating shaft (not shown) extending into the tank 12 and supporting paddles to agitate the liquid mixture within the tank. That shaft is driven by the power takeoff shaft (not shown) of a tractor towing the sprayer, in a manner known in the art.

Figure 2:
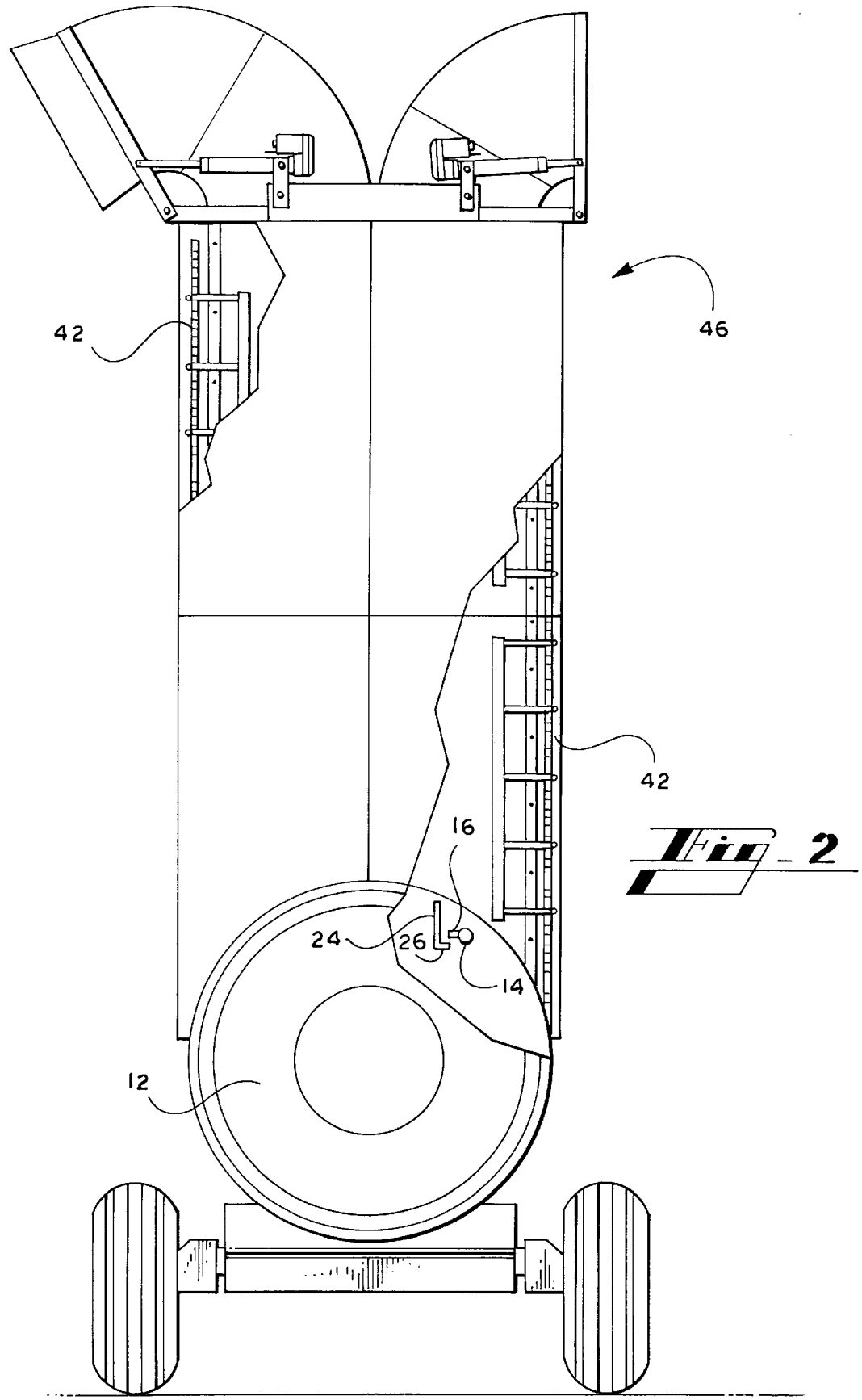
FIG. 2 is a rear elevation view, partly shown in phantom view, of the grove sprayer of the preferred embodiment.

FIG. 2 is a rear view of a sprayer embodying the present invention. The sprayer is designed for spraying trees in groves, and the sprayer includes a frame mounted on wheels suitably spaced apart for towing the sprayer between adjacent rows of trees in the grove. The view of FIG. 2 is partially broken away to show the interior of the tank 12, and in particular the pipe 14 (in end view) located near the uppermost extent of that tank. As best seen in FIG. 2, the nozzles 16 extend from one side of the pipe 14 to direct streams of liquid toward one side of a plate 24 mounted within the tank and extending substantially vertically downwardly within the tank. The lower edge of the plate 24 is bent to form a lip 26 extending a short distance in the direction of the pipe 14. The plate 24 is located in the air pocket formed at the upper end of the tank 12, a short distance spaced apart from the nozzles 16 mounted on the pipe 14, so that the solid streams of liquid emitted from those nozzles impact against the facing surface of the plate.

Returning to the flow diagram of FIG. 1, an outlet line 28 extends from adjacent the bottom of the tank 12 to the input of a pump 30. The pump 30 is driven by the power takeoff shaft of the tractor, although it should be understood that the sprayer can include a separate engine to drive the pump and other equipment if desired. The output of the pump 30 is connected along a line 32 to one end of a cross flow housing 34 containing a cylindrical screen 36. The hollow interior of the cylindrical screen 36 is coaxial with the input line 32 leading from the pump 32 to one end of the housing 34, and with the line 20 extending from the opposite end of the housing to the one end 18 of the pipe 14 within the sprayer tank 12. Liquid flowing into the housing 34 on the line 32 thus passes through the hollow interior of the screen 36 to enter the line 20 substantially unimpeded and without encountering any filtering action.

The cylindrical filter 36 is concentric within the housing 34, so that an annular volume is defined around the exterior surface of the cylindrical filter within the housing. An outlet 38 in the side of the housing 34 communicates with that annular volume. A line 40 extends from the outlet 38 to a nozzle manifold 42 connected to plural spray nozzles 44. Those skilled in the art will realize that the spray nozzle manifold 42 on a typical grove sprayer is one of several such manifolds, and that the manifold may be mounted in vertical arrays on both sides of a spray tower 46 mounted at the back of the sprayer as shown in FIG. 2. Details of the mounting and operation of spray nozzles in a grove sprayer are known to those skilled in the art and need not be repeated herein.

The spray nozzles 44 in a preferred embodiment of the present invention are hydraulic spray nozzles, wherein liquid pressure applied to the nozzles causes atomization of the liquid into a spray for distribution to the trees or other target of the sprayer. The size of the line 40 supplying liquid under pressure to the spray nozzle manifold 42, and other parameters of the plumbing in the preferred embodiment, are selected so as to provide the spray nozzles 44 with the minimum hydraulic pressure required to achieve optimum atomization. However, the pump 30 operates to deliver liquid along the output line 32 at a much greater volume than required for delivery to the spray nozzles 44. This excess volume of liquid from the pump 30 passes substantially unimpeded through the cylindrical filter 36 and the line 20 to enter the pipe 14 within the sprayer tank and produce jets of liquid from the solid-stream nozzles 16 to impact the plate 24 within the sprayer tank.

It will be understood by those skilled in the art that flow valves, pressure gauges, and other elements of the plumbing in a typical sprayer of the kind are omitted from FIG. 1 for clarity. For example, the line 40 delivering liquid to the spray nozzle manifold 42 will contain a control valve for selective operation of the sprayer. Likewise, the line 20 leading to the pipe 14 within the sprayer tank typically includes a gate valve to selectively control the flow within that line.

In operating the present sprayer, an insecticide or other suitable agricultural chemical is added to the sprayer tank 12 along with a quantity of water selected to provide the desired concentration of the chemical. The sprayer operator then starts the pump 30, for example, by engaging the power takeoff drive on the tractor towing the sprayer. It is assumed that a valve (not shown) in the line 40 leading to the spray nozzle manifold is closed, so that the pump 30 only recirculates liquid from the tank through the housing 34 and the cylindrical filter within, and to the solid stream nozzles 16 within the tank. Jets of liquid from those nozzles strike the plate 24 with force sufficient to pulverize any particles of the chemical not already in solution.

When the sprayer arrives at a starting point within the grove, the sprayer operator opens the valve allowing pumped liquid to flow through the line 40 to the manifold 42 and the spray nozzles 44. The liquid pumped to the spray nozzles 44 passes through the wall of the cylindrical screen 36, so that any remaining undissolved chemical or other particulate matter larger than the screen size is prevented from reaching the spray nozzles. The liquid recirculation path to the pipe 14 and the solid stream nozzle 16 within the tank preferably remains open after spraying commences, so that liquid continues to flow longitudinally through the interior of the cylindrical screen, sweeping from the interior of the screen any particles of undissolved chemical for return to the tank via the liquid jet nozzles and the pulverizing impact against the plate 24. The recirculating flow of liquid thus preferably continues unabated until the tank is substantially empty or spraying is discontinued, at which time the sprayer operator would disengage the drive to the pump 30.

The filter 36 within the housing 34 is a 100-mesh filter in a preferred embodiment of the invention. This filter has been found to exclude substantially all particles of undissolved chemicals in powder or dry form, so that such undissolved chemical particles instead flow to the liquid jets produced by the nozzles 16 within the tank, there to undergo pulverizing impact against the plate 24 followed by return to the liquid within the tank.

FIG. 3 shows the plumbing arrangement of an actual grove sprayer embodying the present invention. The sprayer plumbing arrangement of FIG. 3 includes the sprayer tank 12 supplying liquid to a pump 30, with part of that liquid being recirculated through the solid-stream nozzles 16 on the pipe 14 within the tank. Another portion of the liquid from the pump 30 goes to the plural spraying manifolds 42 through separate lines shown by 50 and 52. In an actual grove sprayer embodying the present invention, there are three separate banks of spray nozzles 44 on each side of the sprayer, with each bank having its own nozzle manifold separately connected through suitable lines and valves for operation independently of any other bank. The solid-stream nozzles 16 for each bank are eight in number, capable of delivering nine gallons a minute at 200 psi applied to the inlet 18 of the pipe 14. For simplicity of explanation, the plumbing for selecting individual banks of spray nozzles is not shown in FIG. 3.

The upper end of each manifold 42 connects to the liquid return lines encircled 53 and 54, connecting to the tank 12. When the spray nozzles 44 are operated, the pump 30 supplies to the respective manifold 42 a volume of liquid greater than the amount required to operate the low-volume spray nozzles. The excess volume of liquid returns from the manifolds 42 to the tank 12 through the lines 53 and 54. Liquid thus is constantly flowing through the entire length of each actuated manifold 42 during a spraying operation, so that the relatively concentrated chemical solution cannot collect within a dead end of a spray manifold.

Element 56 on FIG. 3 is a cross flow fitting functionally corresponding to the housing 34 in FIG. 1. That fitting 56 contains the cylindrical screen 36 (not shown in FIG. 3). The line extending from the upper end of the cross flow fitting 56 passes through a gate valve 58, and then enters the line 20 leading to the pipe 14 within the upper end of the tank 12.

Pumped liquid destined for the spray manifolds 42 exits the cross flow fitting 56 through a three-way valve 60 connected to the right side of the cross fitting. Depending on the manual setting of the three-way valve, liquid enters either the upper line 60 or the lower lines encircled 29, both leading to the tee element 61. The upper line 62 simply connects to one side of that tee. The lower line 64 leads to the other side of the tee, through a reducer nipple 68 having a restriction to liquid flow. In an actual embodiment, the lines 62 and 64 each are ¾" in diameter, as is the tee encircled 66. However, the inner diameter of the nipple 68 is ⅜". The third side of the tee 66 connects to the valve assembly 70, which selectively connects the liquid flowing into the tee to one or more of the lines 50 and 52 leading to the spray manifolds 42.

When the valve assembly 70 shuts off all flow to the spray manifolds, the liquid entering the valve assembly through the tee 66 is returned to the tank 12 through the lines 72 and 74.

The arrangement including the three-way valve 60, the upper line 62 leading from that valve to the valve assembly 70 through one side of the tee 66, and the lower line 64 leading to the other side of the tee through the restricted-flow nipple 69, provide a simple and economical way for the sprayer operator to regulate the pressure applied to the spray manifold 42 through the valve assembly 70. By setting the three-way valve 60 so that the entire cross flow of liquid from the fitting 56 enters the upper line 62, that entire flow enters the valve assembly 70 without restriction in the tee 66. However, if the three-way valve 60 is operated so that only the lower line 64 receives liquid from that valve, the entire flow entering the valve assembly 70 passes through the restriction in the nipple 68. That liquid flow produces a pressure drop across the nipple, thereby lowering the input flow to the valve assembly 70. The flow to the valve assembly encircled 70, whether restricted or unrestricted, enters an adjustable pressure regulator 76 downstream from the tee element encircled 66. Depending on the operator-selected setting of the pressure regulator 76, a greater or lesser amount of the flow is recirculated to the tank 12 through the return lines 72 and 74. The pressure immediately upstream from the pressure regulator 76 is applied to the spray manifolds 42, depending on the operation of the valves at the head ends of the lines encircled 50 and 52 supplying liquid to those manifolds. The pressure applied to the spray manifolds thus is increased as the pressure regulator 76 reduces the volume of liquid recirculating to the tank, and vice versa. This arrangement produces a wide range of pressures, ranging from the maximum available to zero, applied to the spray manifolds.

It should be understood that the foregoing relates to a preferred embodiment of the present invention, and that numerous changes and modifications thereto may be made without departing from the spirit and scope of the invention as defined in the following claims.

I claim:

1. A sprayer having at least one spray nozzle for directing a liquid spray toward an agricultural product, comprising:

a tank for receiving a quantity of liquid and an additive in particulate form for mixture with the liquid;

a pump having an inlet in flow communication with the tank and having an outlet for pumping the liquid mixture from the tank;

means defining first and second flow paths for the liquid mixture pumped from the outlet, one such flow path leading to the spray nozzle whereby a spray of the liquid mixture is directed toward the agricultural product;

the other such flow path leading to at least one other nozzle communicating with the tank and directing a stream of the pumped liquid mixture to impact a surface with force sufficient to pulverize particles of the additive entrained in the stream; and the surface being located in flow communication with the tank so that the liquid mixture impacting the surface remains in the tank after impacting the surface, whereby a portion of the liquid mixture is pumped from the tank and recirculates through the other flow path including the pulverizing impact with the surface so as to reduce the amount of undissolved particulate additive in the liquid.

2. The sprayer as in claim 1, wherein:

the impact surface comprises a plate located in the tank above a predetermined maximum level of liquid within the tank, so that the liquid stream from the other nozzle impacts the surface without being impeded by contact with the liquid in the tank, and then drains down to join the liquid in the tank.

3. The sprayer as in claim 1, wherein:

the pumped liquid entering the one flow path passes through a screen operative to prevent particulate additive entrained in the pumped liquid from entering the one flow path and reaching the spray nozzle; and the other flow path is unimpeded by the filter so that entrained particulates can flow to the other nozzle to impact the surface.

4. The sprayer as in claim 3, wherein:

the screen is within a housing having an inlet admitting the pumped liquid mixture; to one side of the screen;

the housing has a first outlet communicating with another side of the screen and leading to the one flow path, so that the liquid mixture flows through the screen before reaching the spray nozzle; and the housing has a second outlet communicating with the one side of the screen and leading to the other flow path.

5. The sprayer as in claim 3, further comprising:

a valve receiving the pumped liquid from the screen in the one flow path and selectably operative to pass that liquid along either of two flow passages, one such passage permitting only a restricted flow relative to the other such passage; and a pressure regulator receiving the flows form both flow passages and selectably operative to recirculate a portion of that flow to the tank, whereby a remaining portion of the flow flows to the one flow path and the spray nozzle.

* * * * *